United States Patent [19]

Campbell

[11] 3,950,690

[45] Apr. 13, 1976

[54] FAIL-SAFE REFERENCE VOLTAGE SOURCE

[75] Inventor: Richard D. Campbell, Harmarville, Pa.

[73] Assignee: Westinghouse Air Brake Company, Swissvale, Pa.

[22] Filed: Nov. 19, 1973

[21] Appl. No.: 417,113

[52] U.S. Cl. .................... 321/10; 317/16; 317/231; 323/22 Z

[51] Int. Cl.² .......................................... H02M 1/14

[58] Field of Search ............ 307/318; 321/8, 47, 10; 317/230, 16, 231, 256; 323/22 Z

[56] References Cited

UNITED STATES PATENTS

| | | | |
|---|---|---|---|
| 1,924,606 | 8/1933 | Hammond | 317/231 |
| 2,841,771 | 7/1958 | Dunleavey | 317/230 |
| 3,063,001 | 11/1962 | White | 321/16 |
| 3,259,834 | 7/1966 | Wright | 307/318 X |
| 3,439,230 | 4/1969 | Lambert et al. | 317/230 |
| 3,614,539 | 10/1971 | Hallenbeck | 317/16 |
| 3,747,014 | 7/1973 | Darrow | 331/113 R |
| 3,842,334 | 10/1974 | Franz | 321/2 |

FOREIGN PATENTS OR APPLICATIONS

| | | | |
|---|---|---|---|
| 1,223,434 | 8/1966 | Germany | 307/318 |

OTHER PUBLICATIONS

Motorola Semiconductor Handbook, June 1, 1965, pp. 2–13, 2–14.

*Primary Examiner*—William M. Shoop
*Attorney, Agent, or Firm*—J. B. Sotak; R. W. McIntire, Jr.

[57] ABSTRACT

This disclosure relates to a vital type of d.c. reference voltage supply. The reference voltage supply is coupled to a suitable source of a.c. voltage. A zener diode rectifies the a.c. voltages and regulates the rectified d.c. voltage. A current-limiting resistor is connected from the zener diode to a four-terminal capacitor which charges to a value approximately equal to the zener breakdown voltage minus the diode voltage drop. Hence, a constant d.c. reference voltage is produced when and only when no critical component or circuit failure is present.

10 Claims, 1 Drawing Figure

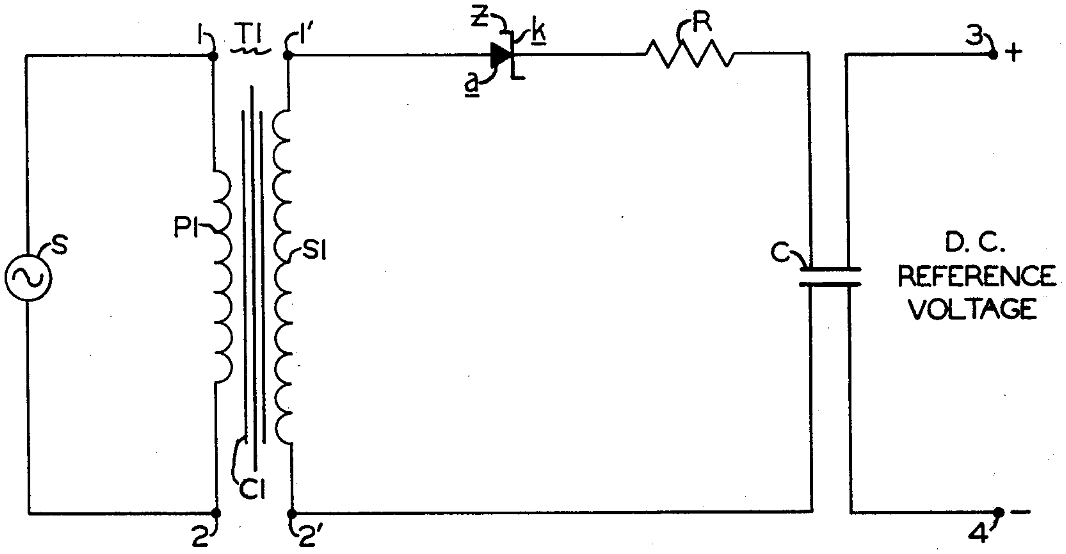
1
T1
1'
Z
k
a
R
3
+
S
P1
S1
C
D. C.
REFERENCE
VOLTAGE
C1
2
2'
4
−

FAIL-SAFE REFERENCE VOLTAGE SOURCE

FIELD OF THE INVENTION

This invention relates to a direct current power supply which operates in a fail-safe manner and more particularly to a vital type of a regulated reference voltage source including a coupling means, a zener breakdown device, a current-limiting resistor and a four-terminal capacitor for developing a constant d.c. potential on a pair of output terminals.

BACKGROUND OF THE INVENTION

In certain automatic control systems, reliability and safety are two of the most important factors in gaining acceptance and approval for vital operations. For example, in vital speed control systems for mass and/or rapid transit operations, it is essential to determine the actual speed of a moving vehicle and thereafter to compare the actual speed with the prescribed speed command for a given area or section of the traveled route in order to prevent injury to individuals and damage to equipment. That is, in such vital speed control systems, it is an authoritative requirement that under no circumstance should the actual speed of a moving vehicle exceed the preselected speed command reguest for any given area or section. Hence in order to ensure safe operation, it is mandatory that a failure in the system must not be capable of simulating a higher than the prescribed speed command in a given area or a lower than the actual speed of a moving vehicle. Thus, each subassembly or portion of the system must operate in a fail-safe manner. Further, it is essential that a critical component or circuit failure must not produce spurious oscillations. For example, in amplifiers and oscillators undesirable oscillating signals may occur due to "sneak" feedback paths or large amplitude noise signals may result due to inadvertent increase in the amplitude of voltage furnished by a power supply. The output of a power supply may dramatically increase due to the loss of regulation or due to failure of the filtering network. Thus, every precautionary measure should be taken to envoke good circuit design and layout and to analyze and evaluate each and every failure in order to prevent higher than normal voltage from being produced by a power supply.

Accordingly, it is an object of this invention to provide a novel direct current power supply which operates in a fail-safe manner.

A further object of this invention is to provide a vital type of a regulated reference voltage source the amplitude of which will not be increased by the presence of a critical circuit or component failure.

Another object of this invention is to provide a fail-safe regulated power supply for producing a constant d.c. voltage when and only when no critical circuit or component failure is present.

Yet a further object of this invention is to provide a vital type of a regulated power supply which furnishes a constant d.c. voltage only in the absence of a critical circuit or component failure.

Yet another object of this invention is to provide a fail-safe reference voltage source which utilizes a minimum number of circuit elements.

Still a further object of this invention is to provide a new and improved fail-safe power supply which employs a zener diode, a current-limiting resistor and a four-terminal capacitor for supplying a d.c. reference voltage.

Still another object of this invention is to provide a unique fail-safe source of a direct current reference voltage which is economical in cost, simple in design, reliable in operation, durable in use and efficient in service.

In accordance with the present invention, the fail-safe direct current reference voltage supply includes a coupling means which may be in the form of a transformer having a primary and a secondary winding. The primary winding is connected to a source of alternating current voltage. The upper terminal of the secondary winding of the coupling transformer is connected to the anode electrode of a zener diode. The cathode electrode of the zener diode is connected via a current-limiting resistor to the upper plate of a four-terminal capacitor. The lower plate of the four-terminal capacitor is directly connected to the lower terminal of the secondary winding. A pair of separate output leads are connected to the upper and lower plates of the four-terminal capacitor, and accordingly a constant d.c. reference voltage is developed on the output leads when and only when no critical component or circuit failure is present.

The foregoing objects and other additional features and advantages of this invention will become more fully evident from the foregoing detailed description when considered in conjunction with the accompanying drawings wherein:

BRIEF DESCRIPTION OF THE DRAWINGS

The single FIGURE is a schematic circuit diagram illustrating a preferred embodiment of the fail-safe circuit current reference voltage supply of the present invention.

DETAILED DESCRIPTION OF THE PREFERRED EMBODIMENT

Referring now to the single FIGURE of the drawings, there is shown the fail-safe circuit or vital type of direct current reference voltage supply embodying the present invention. It will be seen that a suitable source S of alternating current voltage or period signals is connected to terminals 1 and 2. Terminals 1 and 2 are connected to the primary winding P1 of a coupling transformer T1. The transformer T1 includes a magnetic core C1 upon which is wound the primary winding P1, and thus secondary winding S1 is magnetic coupled to primary winding P1 which is also wound on magnetic core C1. As shown, a series regulating device in the form of a zener diode Z is connected to terminals 1' and 2' of the secondary winding S1. That is, the anode electrode *a* of zener diode Z is connected to the upper terminal 1' of the secondary winding S1 while the cathode electrode *k* of diode Z is connected to one end of a current-limiting resistor R. The other end of resistor R is connected to the upper plate of a four-terminal capacitor C. The lower plate of capacitor C is directly connected to lower terminal 2' of the secondary winding S1. Thus, two terminals of the four-terminal capacitor form the input points while two output terminals 3 and 4 are connected to the upper and lower plates, respectively, of the capacitor C. (The four-terminal type of capacitor is employed in order to ensure that the loss of any lead or connection will prevent a.c. ripple from increasing voltage developed across terminals 3 and 4. Thus, the d.c. output voltage is not developed across terminals 3 and 4 when any lead breaks or falls off of capacitor C.)

In describing the operation of the fail-safe direct current reference voltage supply, it will be assumed that the circuit is intact and functioning properly, that the source S of the a.c. voltage is connected to terminals 1 and 2, and that the operation of the circuit is stabilized. Thus, under these assumptions it will be seen a constant d.c. reference voltage will be developed across output terminals 3 and 4. Let us assume that a.c. source S is supplying a positive alternation so that terminal 1 is positive with respect to input terminal 2. Under this condition the primary winding P1 induces an inphase voltage into the secondary S1 so that terminal 1' is positive relative to terminal 2'. Hence, the anode *a* positive with respect to the cathode *k* and the zener diode Z conducts in the forward direction so that the potential at cathode *k* becomes the positive peak value of the a.c. voltage minus the voltage drop of the diode Z, namely $V_{peak}$ - $V_{diode}$ drop. Now when the negative alternation is supplied by source S, the voltage becomes the negative peak value of the a.c. voltage plus the zener breakdown voltage of diode Z, namely, $-V_{peak} + VZ$. Thus, the net d.c. voltage developed across capacitor and appearing on output terminals 3 and 4 is:

$$V_{ref} = \frac{1}{2}[(V_p - V_{diode}\text{ drop}) + (-V_p + E_Z)] = \frac{E_Z - V_{diode}\text{ drop}}{2}$$

It will be appreciated that RC time constant is relatively large in comparison to the period of the a.c. source S. Accordingly, a constant d.c. reference voltage is available at the output terminals 3 and 4 so long as a.c. voltage is supplied by source S and no critical component or circuit failure is present in the power supply circuit. It will be seen that no critical circuit or component failure is capable of increasing value of the d.c. reference voltage developed across terminals 3 and 4. For example, if any of the elements becomes open circuited the integrity of the circuit is destroyed so that no d.c. voltage is produced on terminals 3 and 4. The opening of the zener diode or the resistor interrupts the circuit path to the capacitor C. The opening of or loss of a lead to the capacitor results in its inability to become charged or results in the interruption of the circuit to the output terminals 3 and 4. For example, the opening of the capacitor C or the loss of either or both input leads results in inability to charge capacitor C. The loss of either or both output leads results in the breaking of the circuit to terminals 3 and 4. The transformer T1 provides d.c. isolation from the source S. It will be appreciated that the a.c. signals may be directly coupled to terminals 1' and 2'. For example, the terminals 1' and 2' may be directly connected to a conventional voltage source, such as, a commercial 110 a.c. voltage source rather than being coupled through transformer T1.

If desired, the transformer T1 may be ruggedly constructed with oversized wiring and may be carefully potted in a suitable epoxy resin or the like so that it will be highly unlikely, if not impossible, for shorts to occur in the transformer. The shorting of the zener diode destroys its rectification and breakdown characteristics so that d.c. voltage is not developed across capacitor C. The resistor R is selected of specific carbon composition so that no short can develop in this element. The shorting of the capacitor C destroys its ability to become charged and therefore, no d.c. output voltage is capable of being developed across terminals 3 and 4 during such a failure. Thus, it is apparent that the presently described reference voltage supply operates in a fail-safe manner in that a critical component or circuit failure is unable to result in an increase in the amplitude of the d.c. output voltage appearing across terminals 3 and 4. It will be appreciated that the resistive value of the load should be relatively large in comparison to resistance R in order to obtain optimum operation.

It will be appreciated that various alterations may be made by persons skilled in the art without departing from the spirit and scope of this invention. For example, the polarity of the d.c. voltage developed across output terminals may be reversed by having the electrodes of zener diode Z poled in the opposite direction. Further, the type and voltage rating zener diode breakdown voltage may be varied and selected in accordance with load requirements. Similarly, the turns ratio of transformer T1 may be chosen in accordance with the characteristics of supply voltage source and load demand. In addition, terminals 1' and 2' may be directly coupled to source S or may be indirectly coupled through other impedance means rather than by transformer T1. Further, it is apparent that other modifications and changes may be made to the presently described invention and therefore it is understood that all changes, ramifications and equivalents falling within the spirit and scope of the present invention are herein meant to be included in the appended claims.

Having now described the invention what I claim as new and desire to secure by Letters Patent is:

1. A fail-safe circuit for developing a direct current reference voltage comprising, source of periodic signals coupled to a reverse voltage breakdown regulating means, said reverse voltage breakdown regulating means connected to a first plate of a four-terminal impedance means, a second plate of said four-terminal impedance means coupled to said source of periodic signals, a pair of output terminals coupled to said first and second plates of said four-terminal impedance means so that a direct current reference voltage is developed across said pair of output terminals when and only when no critical circuit or component failure is present in the circuit.

2. A fail-safe circuit, as defined in claim 1, wherein a transformer including a primary winding and a secondary winding couples said source of periodic signals to said reverse voltage breakdown regulating means.

3. A fail-safe circuit, as defined in claim 1, wherein said reverse voltage breakdown regulating means is a semiconductive voltage breakdown device.

4. A fail-safe circuit, as defined in claim 1, wherein said reverse voltage breakdown regulating means is a zener diode.

5. A fail-safe circuit, as defined in claim 1, wherein said four-terminal impedance means is a capacitor.

6. A fail-safe circuit, as defined in claim 1, wherein resistor means limits the current to said reverse voltage breakdown regulating means and said four-terminal impedance means.

7. A fail-safe constant d.c. voltage supply comprising, a transformer having a primary and a secondary winding, said primary winding of said transformer connected to an a.c. signal source, a zener diode having an anode and a cathode electrode, said anode electrode of said zener diode connected to one end of said secondary winding of said transformer, a capacitor having a first and a second pair of terminals, said cathode electrode of said zener diode resistively connected to one of said first pair of terminals, the other of said first pair of terminals connected to the other end of said secondary winding of said transformer, and said second pair of terminals having the constant d.c. voltage developed thereacross only in the absence of a critical component or circuit failure.

8. A fail-safe constant d.c. voltage supply, as defined in claim 7, wherein a short circuit and an open circuit failure of said zener diode removes the constant d.c. reference voltage from said second pair of terminals of said four-terminal capacitor.

9. A fail-safe constant d.c. voltage supply, as defined in claim 7, wherein a short circuit or an open circuit failure of said four-terminal capacitor removes the constant d.c. reference voltage from said second pair of terminals of said four-terminal capacitor.

10. A fail-safe constant d.c. voltage supply, as defined in claim 7 wherein an open circuit failure of said transformer means removes the constant d.c. reference voltage from said second pair of terminals of said four-terminal capacitor.

* * * * *